(12) United States Patent
Langager

(10) Patent No.: US 12,464,111 B2
(45) Date of Patent: Nov. 4, 2025

(54) VIEWING DEVICE AND SYSTEM FOR THE DYNAMIC INTEGRATION OF TWO-DIMENSIONAL IMAGES WITHIN A THREE-DIMENSIONAL ENVIRONMENT

(71) Applicant: Jonathan Langager, Pasadena, CA (US)

(72) Inventor: Jonathan Langager, Pasadena, CA (US)

( * ) Notice: Subject to any disclaimer, the term of this patent is extended or adjusted under 35 U.S.C. 154(b) by 245 days.

(21) Appl. No.: 18/142,576

(22) Filed: May 2, 2023

(65) Prior Publication Data

US 2024/0146898 A1 May 2, 2024

Related U.S. Application Data

(60) Provisional application No. 63/337,396, filed on May 2, 2022.

(51) Int. Cl.
*H04N 13/395* (2018.01)
*H04N 13/346* (2018.01)

(52) U.S. Cl.
CPC ......... *H04N 13/395* (2018.05); *H04N 13/346* (2018.05)

(58) Field of Classification Search
CPC ............................ H04N 13/346; H04N 13/395
USPC ........................................................ 348/51
See application file for complete search history.

(56) References Cited

U.S. PATENT DOCUMENTS

| | | | | |
|---|---|---|---|---|
| 4,306,768 A * | 12/1981 | Egging | ................. | A63F 13/90 463/32 |
| 5,225,861 A * | 7/1993 | Marks | ................. | H04N 13/31 348/E13.058 |
| 6,042,235 A * | 3/2000 | Machtig | ................. | G02B 30/56 348/E7.083 |
| 8,878,780 B2 * | 11/2014 | Chan | ................. | G02B 27/0093 359/462 |
| 9,235,056 B2 * | 1/2016 | Mase | ................. | G02B 27/0101 |
| 10,183,231 B1 * | 1/2019 | Lowe | ................. | A63H 33/22 |
| 10,969,605 B1 * | 4/2021 | Evans | ................. | G02B 30/54 |
| 2011/0261452 A1 * | 10/2011 | Kory | ................. | G02B 27/08 359/471 |

(Continued)

*Primary Examiner* — Christopher S Kelley
*Assistant Examiner* — Ana Picon-Feliciano
(74) *Attorney, Agent, or Firm* — Thomas P. O'Connell; O'Connell Law Firm

(57) ABSTRACT

A viewing system for integrating images from an electronic display device with a three-dimensional display environment. A viewing device with a display housing has a viewing aperture into the inner volume thereof, and a reception structure receives and supports the electronic display device with the display surface thereof facing toward the inner volume of the display housing. A display insert or display slides establishing a three-dimensional environment are disposed at a display location within the display housing to be viewed through the viewing aperture. A two-way anterior mirror is disposed anterior to the display location and a posterior mirror is disposed posterior to the display location, each mirror disposed at an angle operative to reflect images emitted by the display surface of the electronic display device toward and through the viewing aperture to be viewed in integration with the three-dimensional display environment established by the display insert or display slides.

24 Claims, 11 Drawing Sheets

(56) References Cited

U.S. PATENT DOCUMENTS

2014/0340490 A1\* 11/2014 Duffy .................... G02B 30/40
348/51

\* cited by examiner

VIEWING DEVICE AND SYSTEM FOR THE DYNAMIC INTEGRATION OF TWO-DIMENSIONAL IMAGES WITHIN A THREE-DIMENSIONAL ENVIRONMENT

CROSS-REFERENCE TO RELATED APPLICATION

The present application claims priority to Provisional Patent Application No. 63/337,396, filed May 2, 2022, which is incorporated herein by reference in its entirety.

TECHNICAL FIELD

The present invention relates generally to display devices. More particularly, disclosed herein is a viewing device capable of coupling to an electronic display device, such as a tablet computer or smart phone, with a display screen to create a viewing system permitting the dynamic integration of two-dimensional images within a three-dimensional environment.

BACKGROUND OF THE INVENTION

The prior art has disclosed systems for creating the illusion of three-dimensional images. However, such systems of the prior art often require the use of complex viewing devices that are difficult and cumbersome to manufacture. Other viewing devices for creating the illusion of three-dimensional images have been disclosed that are too large or require resources too significant to fabricate efficiently.

In addition, a number of virtual reality headset devices seek to immerse a user within an environment with virtual reality technology carried forth by stereoscopic three-dimensional devices that work only with virtual reality glasses. Because such glasses are involved, users may experience headaches and may not find the experience completely convincing, including by needing to remove the glasses periodically for cleaning or to prevent or remedy fogging and other fouling.

Furthermore, volumetric display devices have been disclosed that demand numerous interdependent mechanical parts and elaborate electronics. Therefore, such volumetric display devices may again demand a number and complexity of components for successful manufacture and operation that prevent widespread commercial adoption and success.

In view of the foregoing, it is apparent that there is a need for a viewing device that is efficient in construction and robust in operation and performance.

SUMMARY OF THE INVENTION

With an appreciation for the state of the art as briefly summarized, the present invention was founded on the basic object of providing a viewing device and a system incorporating such a device that are capable of dynamically integrating two-dimensional images within a three-dimensional environment to provide convincing display performance in an efficient and elegant structure.

The foregoing and further objects, advantages, and details of the present invention will become obvious not only to one who reviews the present specification and drawings but also to those who have an opportunity to make use of an embodiment of the viewing device and viewing system disclosed herein. Although the accomplishment of plural such objects in a single embodiment of the invention may be possible and indeed preferred, not all embodiments will seek or need to accomplish each and every potential advantage and function. Nonetheless, all such embodiments should be considered within the scope of the present invention.

In carrying forth one or more objects of the invention, embodiments of viewing devices according to the invention permit the dynamic integration of two-dimensional images within a three-dimensional environment through engagement with an electronic display device to form a viewing system. The electronic display device can, by way of example and not limitation, comprise a smart tablet or a smart phone. Under such embodiments, a two-way mirror within the viewing device dynamically overlays animation or other content, which may be two-dimensional, from the electronic display device, into a three-dimensional physical environment, such as that of the viewing device. The three-dimensional physical environment may also be illuminated by the electronic display device. The physical environment may additionally or alternatively be illuminated by one or more separate light sources.

In certain practices of the invention, the viewing device can be caused to have a rounded, arcuate bottom portion, whether by a rounded formation of the lower portion of the viewing device, by coupling a rounding structure to the lower portion of the viewing device, or otherwise. By way of non-limiting examples, the rounded bottom portion of the viewing device can be formed to permit longitudinal rocking to and from the viewer or the rounded bottom portion can be formed to permit lateral rocking across the viewer's line of sight or the rounded bottom portion can be formed to permit universal rocking in any direction, such as through a semi-spherical rounding of the bottom portion of the viewing device. The rocking functionality of the viewing device permits the user to interact intuitively with the viewing device and with components of an electronic display device, such as a gyroscope or accelerometer, housed within or otherwise engaged with the viewing device.

The viewing device may also contain a three-dimensional physical environment, such as a landscape. The three-dimensional environment can be made from one, several, or numerous two-dimensional slices or slides. Some or all of the environment could additionally or alternatively be fully three-dimensional and manufactured that way. The environment can also be molded or otherwise formed, such as out of plastic, metal, wood, or any other material or combination thereof. Embodiments of the invention could incorporate miniature model components, such as miniature components manufactured for doll house, model train, or other applications, or model components could be specially manufactured by any effective method. Some or all of the environment can be removable and replaceable. With that, a single viewing device could selectively house various environments and variations on environments. For instance, different animations, content, and content sequences can be matched to corresponding environments.

Viewing devices according to the invention have additional interest and play value not only in view of such selectively variable environments but also as a result of the built-in interactivity deriving from the opportunity to add and remove components that may interact with the remainder of the environment to create added effects. Compared to virtual reality headset devices, which merely attempt to immerse the user in a simulation, viewing devices according to the present invention provide the user with a more omnipresent or 'god-like' perspective to view and interact with a physical environment while also being enabled to dynamically apply animation that can be incorporated into that environment. Compared to stereoscopic three-dimensional devices that may only be used by a single viewer wearing specialized glasses, which can cause headaches and limit the convincing nature of the display, viewing devices as disclosed herein may be viewed by multiple people from different angles without using glasses. Furthermore, the disclosed viewing device is elegant, robust, and efficient in construction and operation and does not require a large number of components or mechanical or electronic parts.

In one implementation, the environment can be lit by light emanating from the electronic display device. The environment can additionally be lit by further illumination sources positioned outside or within the viewing device. In one non-limiting implementation, the environment is lit only by the electronic display device, which again can be a smart phone, a smart tablet, or another display device.

In one implementation, a two-way mirror is positioned within the viewing device to cause animation content, display content, or a sequence or sequences of content from the electronic display device to be dynamically overlaid directly onto aspects or portions of the environment inside the viewing device. As a result, the content from the electronic display device will appear to float at the same depth as aspects of the physical environment. As an example, the above-described system and method can be used, for instance, to animate leaves on a physically rendered tree within the environment, or to animate smoke coming out of a physical chimney within the environment. Geometry from the animation content, display content, or a sequence or sequences of content from the electronic display device thus creates the optical illusion that a physical portion of the environment is dynamic, moving, alive, or in motion.

In practices of the invention, a camera of the electronic display device can be used as an input device to increase the interactivity of the viewing device and of the viewing system created by the viewing device in combination with the electronic display device. For instance, a mirror can be positioned to be operative to change the effective angle of the camera of the electronic display device. The camera can also be used to track physical objects inside the viewing device, including physical objects moving within the viewing device.

In one illustrative but non-limiting example, the viewing device can be modified to function as a coin bank. With that, a coin can be inserted through a slot in the viewing device and allowed to roll down a ramp within the viewing device. The motion of the coin within the viewing device would be tracked by the camera of the electronic display device. Animation content, display content, or a sequence or sequences of content from the electronic display device can then be electronically mapped onto the coin as it rolls down the ramp inside the viewing device. For example, the coin could be animated so as to appear on fire. The coin could additionally or alternatively be highlighted with illumination, such as from a simulated neon light. A similar mapping technique could be used to map animation content, display content, or a sequence or sequences of content from the electronic display device onto a ball, such as a pinball, within the viewing device. Another mapping technique could be used to map animation content, display content, or a sequence or sequences of content from the electronic display device onto a coin, chip, ball, or other article in a game similar to that of the ricocheting game marketed under the registered trademark PLINKO® of the Fremantlemedia Netherlands B.V. of the Netherlands where gameshow contestants drop a game piece to ricochet through a vertical structure having pegs eventually to fall into a given slot specifying a particular prize or reward.

The camera on the electronic display device can additionally or alternatively be used to track changes to the environment inside the viewing device. In one implementation, for example, the housing of the device could be configured as a cylinder so that it could be rolled along a surface. With that, a user could look into the end of the cylinder as if he or she were looking through the end of a tube, and animation could be produced, such as to animate a hamster running on a wheel or any other type of display.

In one implementation, the viewing device can be modified using two eyepiece lenses to produce stereoscopic images, similar to the stereoscopic viewing devices sold under the registered trademark VIEW MASTER® by View-Master International Group, Inc. of Portland, Oregon. In such embodiments, each eye would look at a different perspective of the same three-dimensional image. There, the physical environment could also be duplicated with one physical environment provided for each eye. Additionally or alternatively, stereoscopic images could be printed onto two-dimensional slices or slides retained within the viewing device to be perceived through each eye.

In certain implementations, the viewing device can take the form of an augmented reality viewing device or a virtual reality headset device. Such embodiments of the viewing device can be crafted using techniques similar to those previously described. However, instead of containing an environment, the augmented reality viewing device would use a two-way mirror to overlay animations on the actual world. The user would look through the viewing device the way one would look through a viewfinder or a telescope. A gyroscope function of an electronic display device incorporated within or retained by the viewing device to form a viewing system could then be used to change the perspective and position of the animation being viewed, making it appear to float in actual space. The augmented reality viewing device could also use the stereoscopic technique described above. One potential result of such a system could be a three-dimensional animation that would appear to float in actual space.

In one implementation, the viewing device can be modified with an eyepiece to allow the viewer to change focus. The viewer can then rack focus between the foreground and the background. The eyepiece can, for example, be retained to swivel or to move in any direction, such as on a track, thereby allowing the viewer to visually explore the physical space and animation inside the viewing device.

In certain implementations, the viewing device can be configured as an interactive microscope. For example, a two-way mirror can be used to overlay animation onto a slide that is being viewed through the microscope.

In other implementations, the viewing device and the system and method disclosed herein can be caused to operate as a laser tag device. To that end, a gun-like housing for the electronic display device can be incorporated. Then, the user can look through a two-way mirror that operates to overlay animation content, display content, or a sequence or sequences of content from the electronic display device from the display device on top of the actual world. The viewing device can then serve as a sighting scope in a larger environment through which the user can move. The camera of the electronic display device can also be used to track other users so that a user can, for instance, "lock on" to others. For example, a user could fire an imaginary missile, projectile, bullet, or other element of animation at another user. Laser tag functionality could be combined with augmented reality functionality. The user could, for example, look through the sighting scope, which would reveal simulated ghosts, monsters, targets, or other lurking imaginary creatures, objects, or items that are hidden in the actual world, but exist in a three-dimensional virtual world created by the viewing system.

In another practice of the invention, a two-way mirror can be used to overlay animations onto a globe. When the globe is spun, animation content, display content, or a sequence or sequences of content from the electronic display device projected onto the globe change accordingly.

Still further, it is contemplated that the viewing device could overlay a static image onto a small three-dimensional environment without the use of a screen of any kind. Instead of an electronic display device, a transparency with an image printed thereon can be placed within the viewing device. Upon looking into the viewing device, particularly where additional illumination is provided, such as by ambient or artificial light, the light will travel through diffusion material and then through the transparency. The image printed on the transparency can then be reflected against a two-way mirror within the viewing device. The area around the image on the transparency can be blacked out while the physical environment behind it is lit by ambient or artificial light, which also travels through diffusion material. Such a system could be used, for example, to project the image of a ghost—or a secret message—onto a small physical environment. Furthermore, if the area above the transparency is covered thereby keeping light from passing, the projected image disappears. There could, for instance, be a dedicated cover that allows the user to control light going through the transparency. As a result, opening such a cover or otherwise selectively permitting the passage of light could reveal a ghost projected into the physical environment.

In one embodiment, the viewing system for integrating images from an electronic display device with a three-dimensional display environment can be considered to be founded on a viewing device. The viewing device has a display housing with an inner volume, an anterior end, and a posterior end. A viewing aperture is disposed in the anterior end of the display housing for permitting a line of sight into the inner volume of the display housing, and a reception structure, such as a peripheral ridge, a reception slot, a simple support surface, or any other reception structure is provided for receiving and supporting the electronic display device with a display surface of the electronic display device facing toward the inner volume of the display housing. The display housing is at least partially open proximal to the reception structure, such as by having an open top of the display housing, potentially below a top cover thereof. With that, images emitted by the display surface of the electronic display device can be received into the inner volume of the display housing. At least one display insert is provided for being disposed at a display location within the display housing to be viewed through the viewing aperture. The display insert establishes a three-dimensional environment. A first mirror is retained within the housing disposed at an angle operative to reflect images emitted by the display surface of the electronic display device toward and through the viewing aperture to be viewed in integration with the three-dimensional display environment within the display housing established by the display insert. Embodiments of the viewing system can further include an electronic display device, such as but not limited to a tablet computer or a smart phone, with a display surface.

In certain manifestations of the invention, the at least one display insert comprises a plurality of display slides, each with one or more apertures therethrough defining one or more decorative design features. The plural display inserts can be selectively retained within the display housing to cooperate to establish the three-dimensional display environment. To facilitate that, the display housing can have plural receiving formations such as receiving slots, for individually receiving the plural display inserts to form the three-dimensional display environment. The plural receiving formations can be operative to retain the plural display inserts in spaced, parallel planes orthogonal to a longitudinal of the display housing from the anterior to the posterior end thereof. The plural display inserts can be removable and replaceable relative to the display housing such that the three-dimensional display environment can be selectively varied.

The first mirror can, for instance, comprise a two-way mirror disposed anterior to the display location of the at least one display insert. With that, the two-way mirror is interposed between the anterior end of the display housing and the location of the at least one display insert. Furthermore, embodiments of the viewing system can further comprise a second mirror disposed posterior to the display location of the at least one display insert. Under such constructions, the second mirror is interposed between the posterior end of the display housing and the location of the at least one display insert. In certain practices of the invention, the first and second mirrors are disposed at an approximately 45-degree angle relative to a longitudinal of the display housing.

Still further, it is disclosed that the display housing can have a lower rocking surface operative to permit a rocking of the display housing, such as laterally, forward and backward, or in all directions.

In certain embodiments, a mobile object conveying surface can be provided for receiving and guiding mobile objects inserted into the display housing. With that, the mobile objects so inserted can be interacted with by visual display data emitted by the electronic display device. For example, the mobile object conveying surfaced could take the form of a ramp for permitting a mobile object, such as a coin, a ball, or any other mobile object, inserted into the display housing to roll therealong.

In particular embodiments of the invention, the at least one display insert can take the form of a three-dimensional insert. The three-dimensional insert can have a plurality of layers of display members, each with one or more decorative design features. The decorative design features and the plurality of layers of display members can cooperate to establish the three-dimensional display environment. The three-dimensional insert can removable and replaceable relative to the display housing. With that, the three-dimensional display environment can be selectively varied.

Other embodiments of the invention can be characterized as viewing systems for integrating images from a transparency with a three-dimensional display environment. Such viewing systems can again be founded on a viewing device. The viewing device again has a display housing with an inner volume, an anterior end, and a posterior end. A viewing aperture is disposed in the anterior end of the viewing device for permitting a line of sight into the inner volume of the display housing, and a reception structure is provided for receiving and supporting the transparency. The display housing is at least partially open at least optically proximal to the reception structure whereby images disposed on the transparency can be received into the inner volume of the display housing. Open optically may mean that there is an absence of structure or that a structure, such as a transparent panel, is provided for permitting the passage of light. The display housing has a volume therewithin for receiving a three-dimensional environment, and a first mirror is retained within the housing. The first mirror is disposed at an angle operative to reflect images received from the transparency toward and through the viewing aperture to be viewed in integration with the three-dimensional display environment within the display housing. In certain embodiments, an opaque cover can be provided for selectively blocking or permitting ambient light to be received through the transparency and into the inner volume of the display housing.

Thus has been outlined, rather broadly, certain non-limiting features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying drawing figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings, wherein.

DETAILED DESCRIPTION

Figure 1:
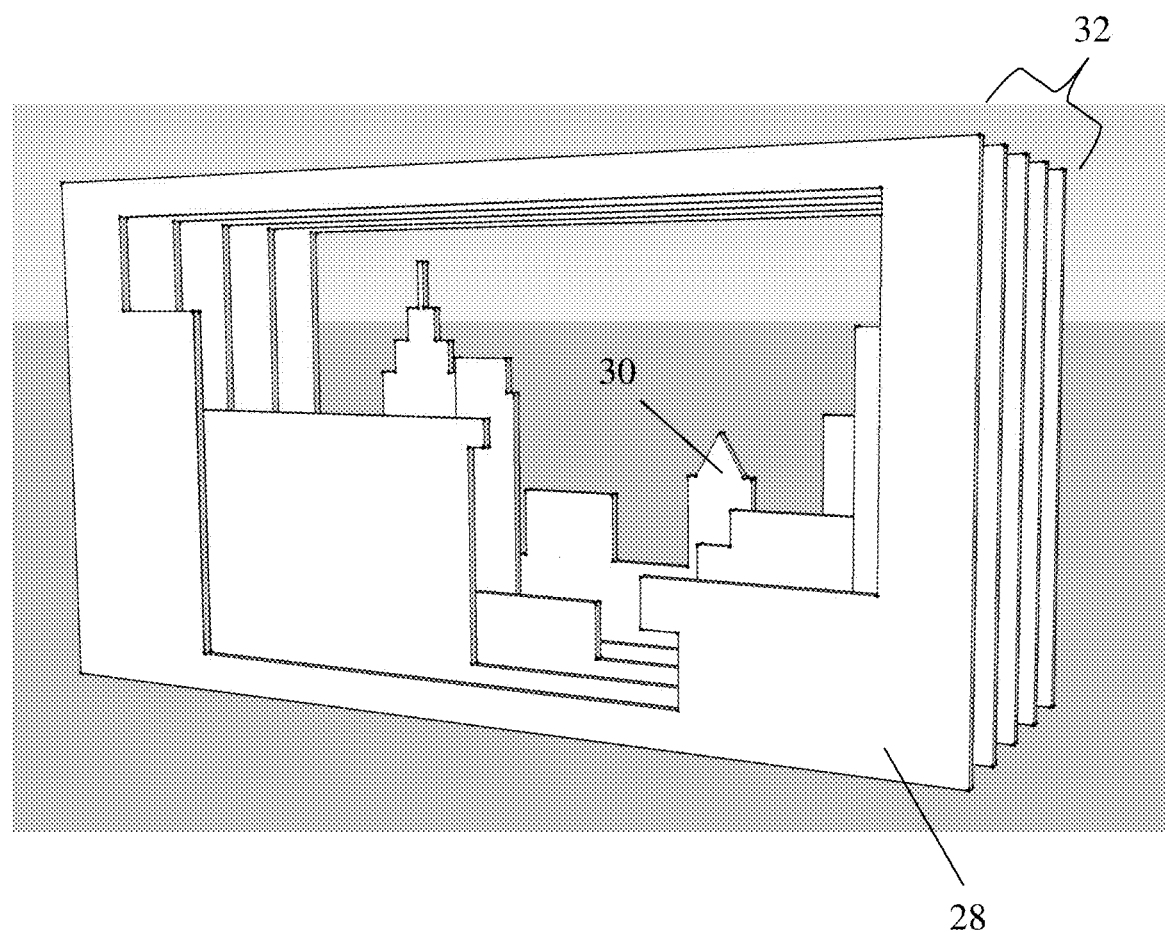
FIG. 1 is a perspective view of a composite display environment with a plurality of environment slides according to the present invention.

The viewing device and the viewing system disclosed herein are subject to a variety of embodiments, each within the scope of the invention. However, to ensure that one skilled in the art will be able to understand and, in appropriate cases, practice the present invention, certain preferred embodiments of the broader invention revealed herein are described below and shown in the accompanying drawing figures.

Looking more particularly to the drawings, a viewing device according to the present invention is indicated generally at 10 in FIGS. 2 through 7. Components of the viewing device 10 are shown apart in FIG. 1. With combined reference to those figures, the depicted embodiment of the viewing device 10 can be considered to be founded on a display housing 12 with left and right sidewalls 14 and 16, a front wall 18, a rear wall 22, and a bottom 25 that together define an inner volume. In this non-limiting example, the walls 14, 16, 18, and 22 and the bottom 25 have intermeshing crenelations that cooperate to enable the assembly of the walls 14, 16, 18, and 22 and the bottom 25 into a unitary, box-shaped housing structure.

Figure 3:
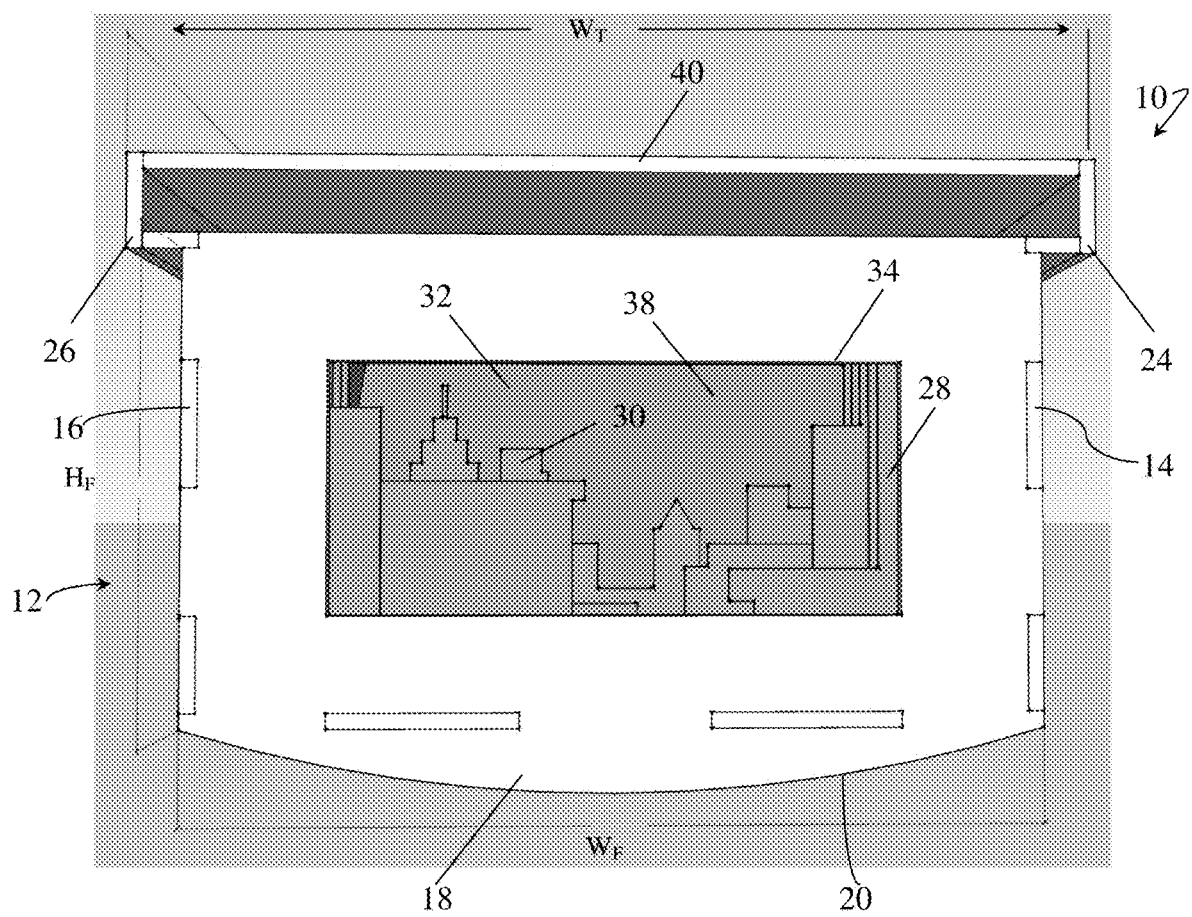
FIG. 3 is a view in front elevation of a viewing device pursuant to the invention.

A left support rail 24 is disposed at the top of the left wall 14, and a right support rail 26 is disposed at the top of the right wall 16. As shown in FIGS. 3 through 7, a top panel 40 is supported in a plane spaced above the left and right support rails 24 and 26 by an outer wall structure formed by a left wall extension 27 that extends upwardly from the outer edge of the left support surface 24, a right wall extension 29 that extends upwardly from the outer edge of the right support surface, and by an extension of the rear wall 22. With reference to FIGS. 3 and 5, for example, the left and right support rails 24 and 26 and the top panel 40 cooperate to define a reception slot sized with a top length dimension $L_T$ and a top width dimension $W_T$ for receiving an electronic display device 100, such as a computer tablet, a smart phone, or another electronic display device 100. As FIG. 3 shows, an electronic display device 100 can thus be slidably received into the reception slot below the top panel 40 with the display surface thereof facing into the inner volume of the display housing 12. Below the top panel 40, the display housing 12 is open to the inner volume thereof whereby images emitted by the display surface of the electronic display device 100 are projected into the inner volume of the display housing 12. Where included, the top panel 40 fitted over the top of the display housing 12 operates to keep reflections and visual image data from the electronic display device 100 within the inner volume of the display housing 12.

Figure 2:
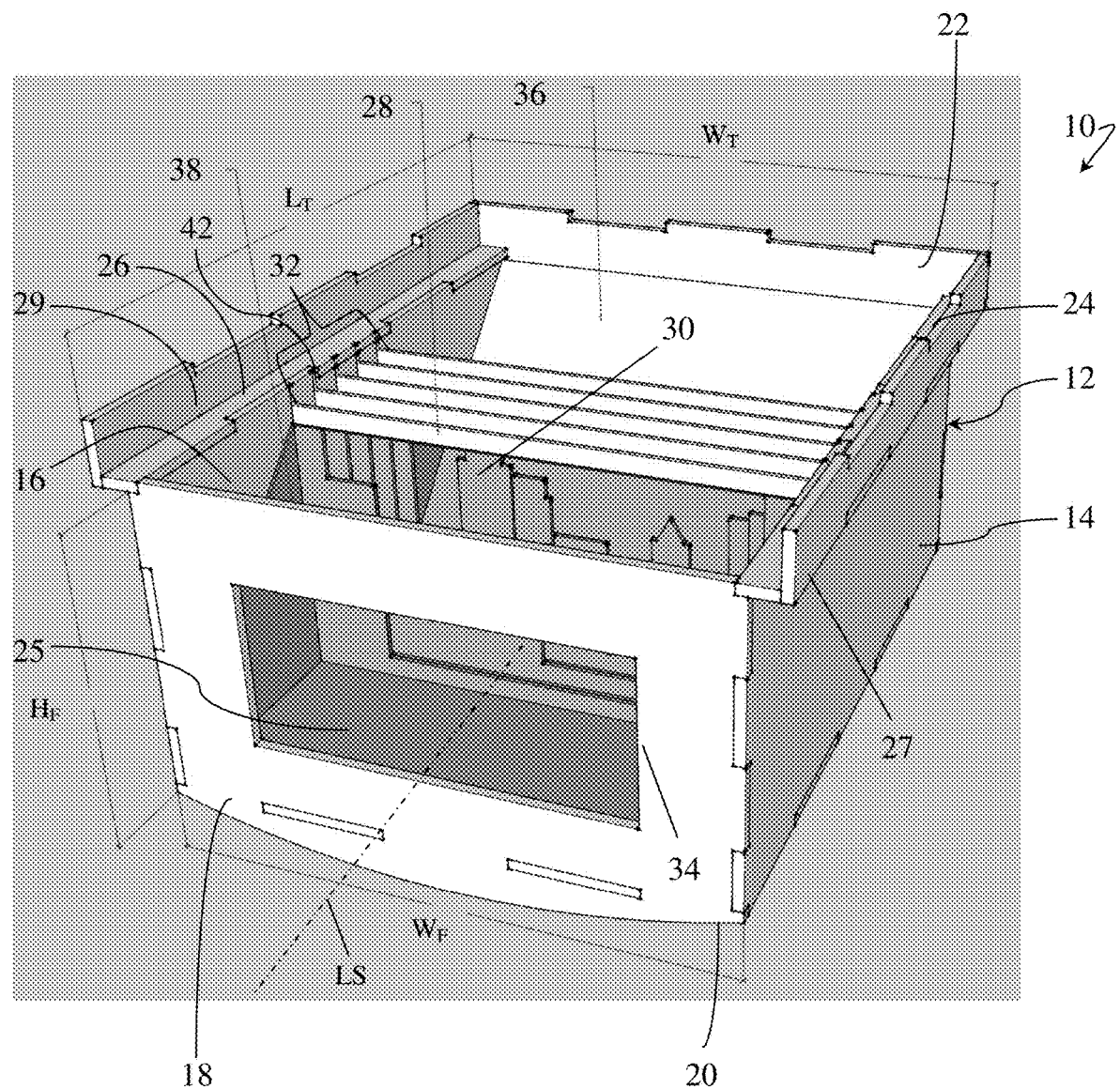
FIG. 2 is an upper perspective view of a viewing device according to the invention disclosed herein.

As FIG. 2 illustrates, the front wall 18 can be considered to have a height dimension $H_F$ and a width dimension $W_F$, and a viewing aperture 34 is disposed in the front wall 18 for permitting a viewing into the inner volume of the display housing 12. Each of the left and right walls 14 and 16 has a series of vertically-disposed slots 42 spaced in series therein. The slots 42 in the left and right walls 14 and 16 are disposed in opposition such that a plurality of environment display slides 28 can be selectively received therein. The environment display slides 28 can each be formed from a flat panel. The environment display slides 28 could be made of any suitable material, such as cardboard, a paper-based material, plastic, a plastic-based material, metal, a pseudo-metallic material, or any other material that now exists or that may hereafter be developed.

As FIG. 1 shows, each environment display slide 28 has one or more apertures therethrough that define one or more decorative design features 30. In the non-limiting embodiment of FIG. 1, for instance, the design features 30 comprise elements of a cityscape with building silhouettes and other features creating a backdrop of a city skyline. The plural display slides 28 cooperate to form a composite display environment 32. The environment slides 28 and the design features 30 thereof can be formed in any effective manner, including by molding, cutting, three-dimensional printing, or any other method.

The composite display environment 32 is thus essentially a multi-layer environment created from the plurality of environment display slides 28 with each environment display slide 28 adding another layer of depth to the composite display environment 32. While the composite display environment 32 illustrated happens to be a backdrop of a city skyline, the possible variations of the composite display environment 32 are unlimited. In other non-limiting instances, the composite environment 106 could take the form of a forest, a natural landscape with layers of mountains, a house, a stage setting, a beach, or any other composite display scene that can be rendered with a number of different layers. While the environment display slides 28 in the depicted manifestation of the invention are stationary, it is within the scope of the invention for the environment display slides 28 to be mobile manually or automatically. Since the slides 28 are removably received within the display housing 12, some or all of the environment display slides 28 can be readily removed and replaced thereby permitting the user to adjust the nature and character of the composite display environment 32 provided by the plural display slides 28.

Figure 4:
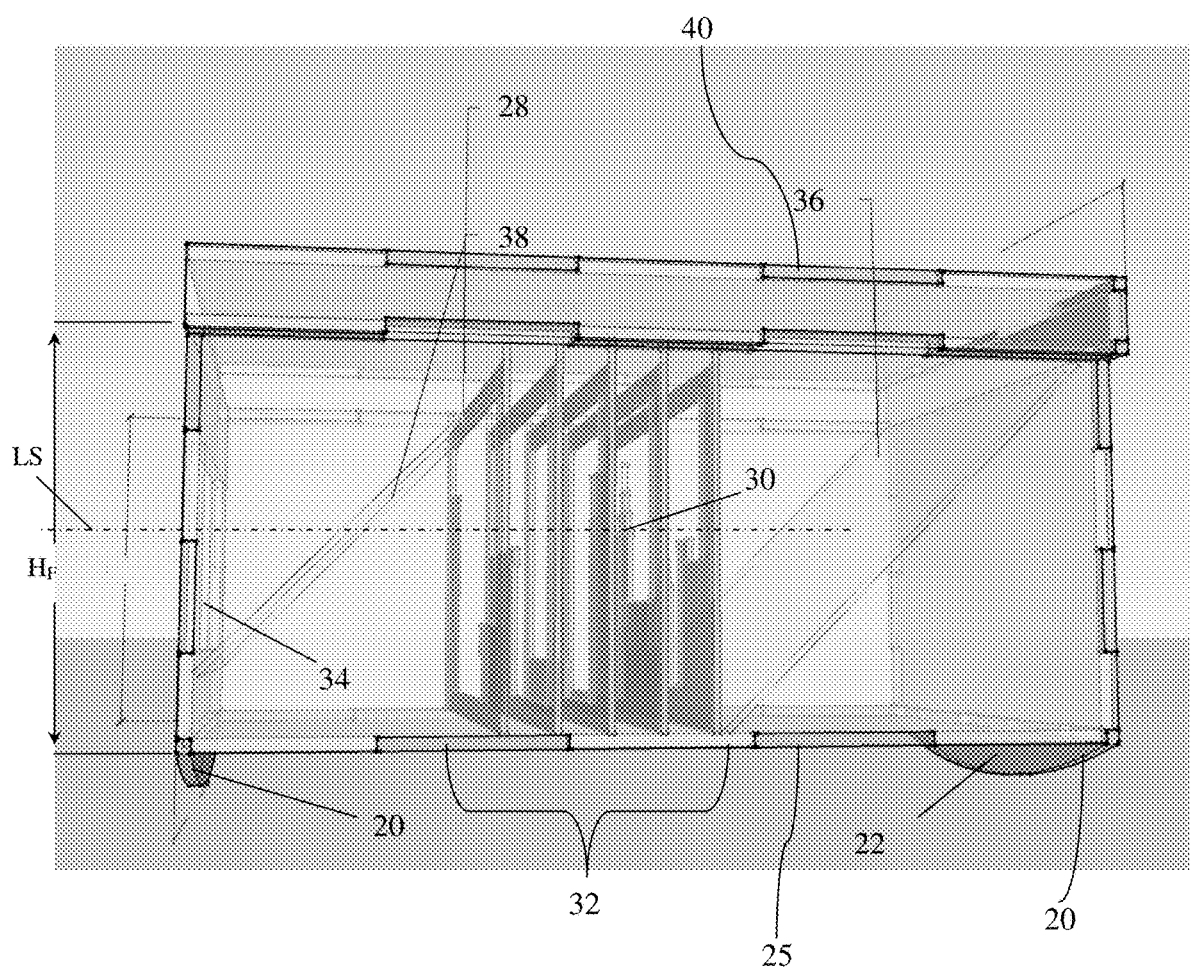
FIG. 4 is a lateral perspective view of a viewing device according to the present invention with the right side wall rendered transparent for visibility.
Figure 5:
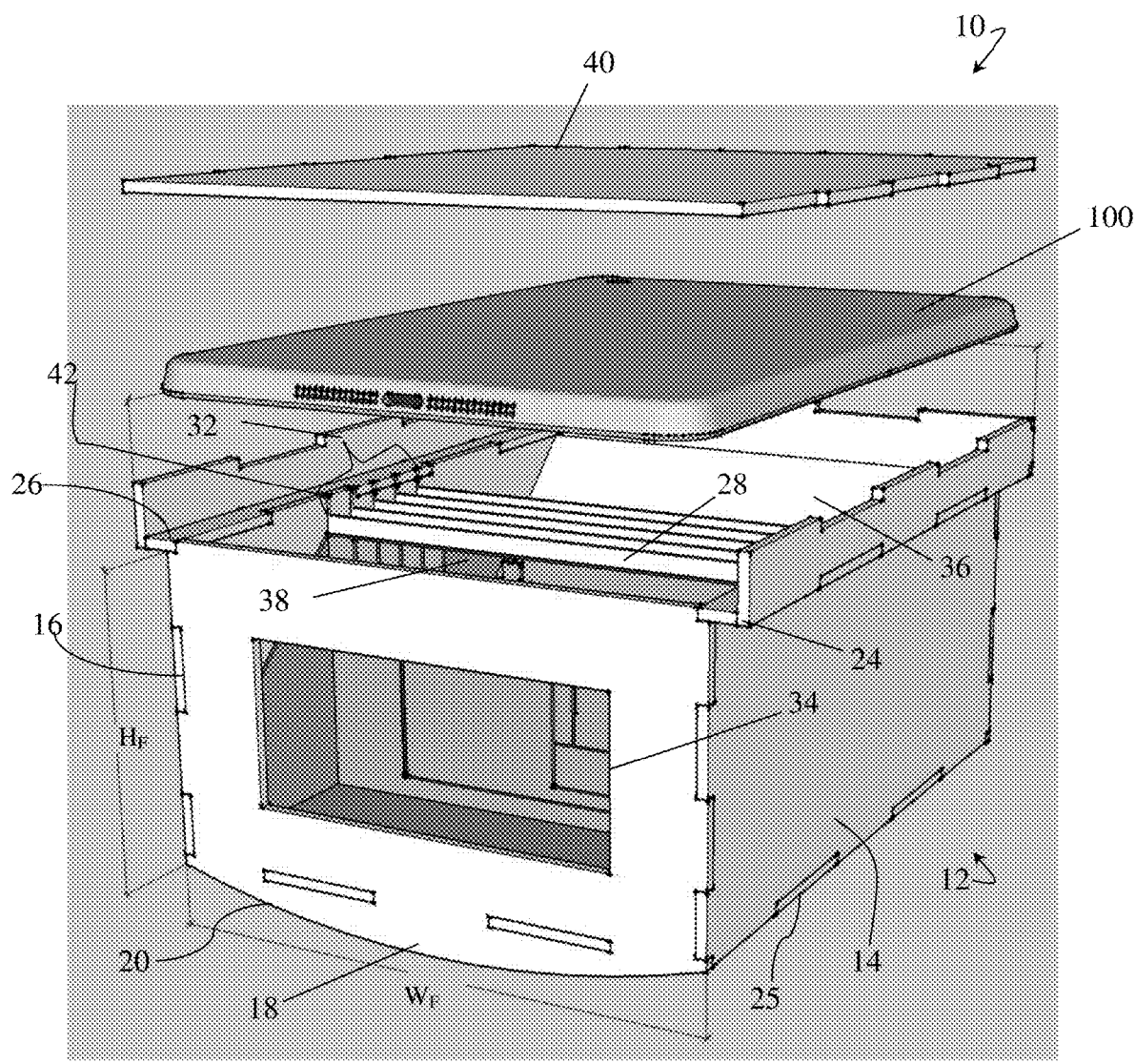
FIG. 5 is a partially-exploded perspective view of a viewing device according to the invention incorporating an electronic display device.
Figure 6:
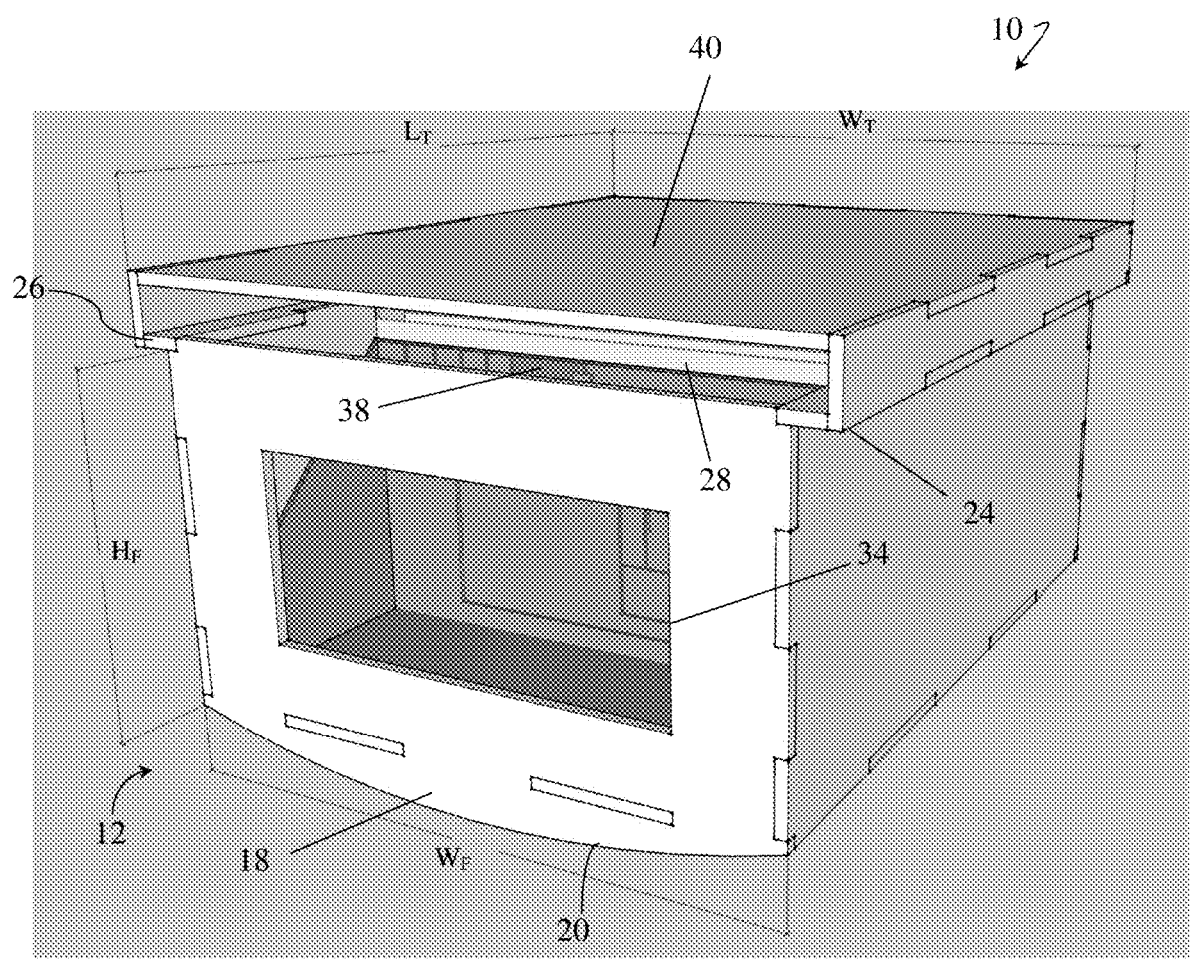
FIG. 6 is a perspective view of an alternative embodiment of a viewing device with a top according to the invention disclosed herein.
Figure 7:
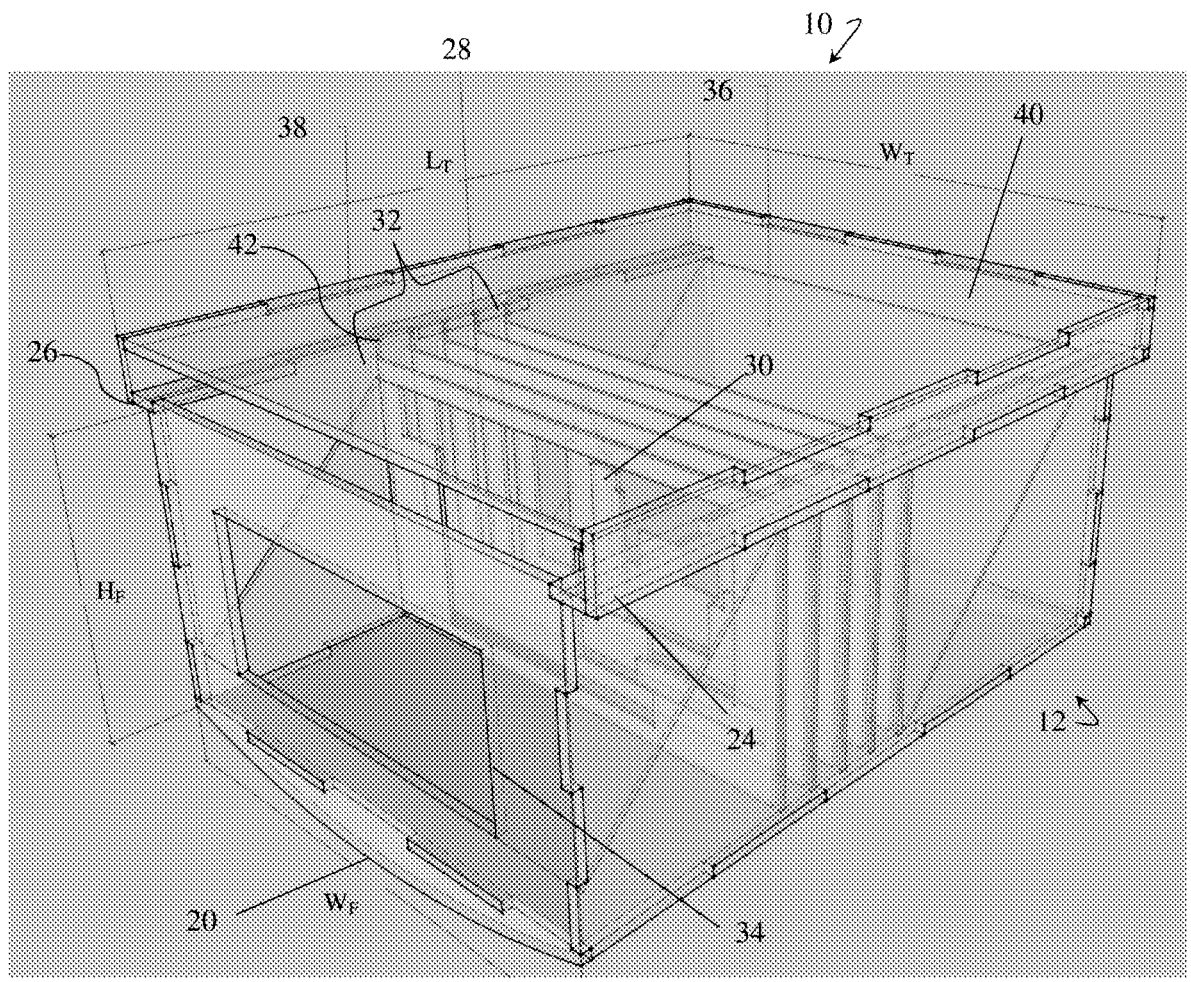
FIG. 7 is a perspective view of a viewing device with a top according to the present invention with components thereof rendered transparent for visibility.

As seen best perhaps in FIGS. 2 and 4, the environment display slides 28 are disposed in parallel planes standing vertically when the viewing device 10 is at rest. The environment display slides 28 span across the inner volume of the display housing 12 and are disposed generally at a longitudinal mid-portion thereof. A line of sight LS is established into the display housing 12 through the viewing window 34 in the front wall 18. The line of sight LS communicates codirectionally with a longitudinal through the inner volume of the display housing 12. The line of sight LS is orthogonal to the plural environment display slides 28, which again are retained in parallel planes in this case by the parallel slots 42 in the left and right side walls 14 and 16 of the display housing 12.

A two-way anterior mirror 38 is fixed in place within the display housing 12 anterior to the plural environment display slides 28 and the slots 42 therefor such that the two-way anterior mirror 38 is interposed between the viewing window 34 and the composite display environment 32 formed by the plural display slides 28. Thus, the composite display environment 32 formed by the plural display slides 28 is viewed along the line of sight LS through the two-way anterior mirror 38. The two-way anterior mirror 38 is retained tilted rearwardly within the display housing at a 45-degree angle with respect to the planes of the plural environment display slides 28 and with respect to the line of sight LS that communicates longitudinally within the display housing 12. As such, the two-way anterior mirror 38 has an upturned face angled at 45 degrees relative to the longitudinal line of sight LS and at a 45-degree angle relative to the top of the display housing 12.

Further, a rear mirror 36 is fixed in place posterior to the plural environment display slides 28 and the slots 42 therefor such that the rear mirror 36 is interposed between the rear wall 22 and the composite display environment 32 formed by the plural display slides 28. The rear mirror 36 is retained tilted rearwardly within the display housing at a 45-degree angle with respect to the planes of the plural environment display slides 28 and with respect to the line of sight LS that communicates longitudinally within the display housing 12. As such, the rear mirror 36 has an upturned face angled at 45 degrees relative to the longitudinal line of sight LS and at a 45-degree angle relative to the top of the display housing 12.

Under this construction with the two-way anterior mirror 38 tilted at an approximately 45-degree angle within the display housing 12 and interposed between the composite display environment 32 and the viewing window 34, reflections of images projected by the electronic display device 100 from the two-way anterior mirror 38 are viewable through the viewing window 34. The rear mirror 36, which again is similarly disposed at an approximately 45-degree angle within the display housing 12 posterior to the plural environment display slides 28 provides a secondary layer of reflections of images projected by the electronic display device 100. While two mirrors 36 and 38 are depicted in this example, it should be considered within the scope of the invention except as may be expressly excluded by the claims to include further mirrors to obtain desired visual effects.

The dual reflections from the two-way anterior mirror 38 and the rear mirror 36, which can comprise animation content, display content, or a sequence or sequences of content from the electronic display device 100, can be perceived along the line of sight LS through the viewing window 34. The dual reflections can be viewed through the viewing window 34 in tandem and in cooperation with the composite display environment 32 formed by the display features 30 of the plural display slides 28 to create the illusion of a three-dimensional optical image when a user is looking through the inner volume of the display housing 12 of the viewing device 10 through the viewing window 34. The dual reflections from the two-way anterior mirror 38 and the rear mirror 36 project animation upon the environment display slides 28 that form the composite display environment 32 thereby creating an animation effect through the viewing window 34 wherein the display features 30 within the environment display slides 28 appear to be animated, moving, or alive. The viewing window 34 thus establishes a display window through which a viewer can view animations, augmentations, enhancements, or alterations to the composite display environment 32 by operation of the dual reflections from the two-way anterior mirror 38 and, additionally or alternatively, the rear mirror 36.

The top length dimension $L_T$ and the top width dimension $W_T$, which define the reception slot for receiving the electronic display device 100, establish the length and width dimensions of the top panel 40. In one non-limiting implementation, the top length dimension $L_T$ is approximately 8.875 inches, the top width dimension $W_T$ is approximately 7.625 inches, the front wall height dimension $H_F$ is 3.75 inches, and the front wall width dimension $W_F$ is 6.75 inches, but it will be understood that display housings 12 of different overall and relative dimensions are possible and within the scope of the invention.

As is illustrated in the embodiments of the display device 10 of FIGS. 2 through 7, the display housing 12 can be constructed with a lower rocking surface 20 that permits the display housing 12 to be rocked, which rocking may be done manually or automatically. The lower rocking surface 20 can, for instance, permit the display housing 12 to be rocked forward and backward or laterally from side to side or in any direction, including forward and backward, laterally, or in some combination thereof. As in the depicted construction, for example, the lower rocking surface 20 could be embodied as arcuate lower edges of the front and rear walls 18 and 22 to permit lateral rocking. Alternatively, the lower rocking surface 20 could be embodied as arcuate lower edges of the left and right walls 14 and 16 to permit forward and backward rocking. Still further, the lower rocking surface 20 could be embodied as a bi-directionally arcuate portion of a sphere to permit multi-directional rocking.

Each such manifestation of the lower rocking surface 20 enables the viewing device 10 and the user to interact intuitively with components of an electronic display device 100 retained by the viewing device 10, such as within the receiving slot atop the display housing 12. For example, a gyroscope and, additionally or alternatively, an accelerometer incorporated the electronic display device 100 can be exploited, potentially in cooperation with dedicated computer software retained in electronic memory within the electronic display device 100, in the cloud, or otherwise, and executed through a computer processor of the electronic display device 100 to produce display effects based at least in part on the rocking of the display housing 12.

According to practices of the invention, the electronic display device 100 can comprise any electronic display device 100 capable of displaying visual data, including but not limited to a smart tablet, a smart phone, a monitor, a flat display screen, or any other electronic display device 100. When operated pursuant to the invention, the electronic display device 100 is operable to display animation content, display content, or a sequence or sequences of visual-based content.

The visual data content projected by the electronic display device 100 can be combined with the composite display environment 32 through reflections from the two-way anterior mirror 38 and the rear mirror 36 to create a variety of optical effects and optical illusions that the user can experience when he or she looks through the viewing window 34. For instance, where the composite display environment 32 is a city skyline as in the present example, visual data from the electronic display device 100 could include various windows of the city buildings comprising features 30 of the environment display slides 28 lighting up, or the visual data could comprise fireworks in the background or smoke, clouds, or birds flowing through the scene. Features 30 and other components within the composite display environment 32 can also be projected with focused animations focused just in the area of that feature 30 or other component to create the effect that a particular feature 30 or other component is in motion or moving or being animated. The reflections of imaging projected by the electronic display device 100 from the two-way anterior mirror 38 and the rear mirror 36 can also be adjusted through computer software programming retained in electronic memory and executed on a computer process of the electronic display device 100 or through manual feedback and control to achieve desired display effects.

Figure 10:
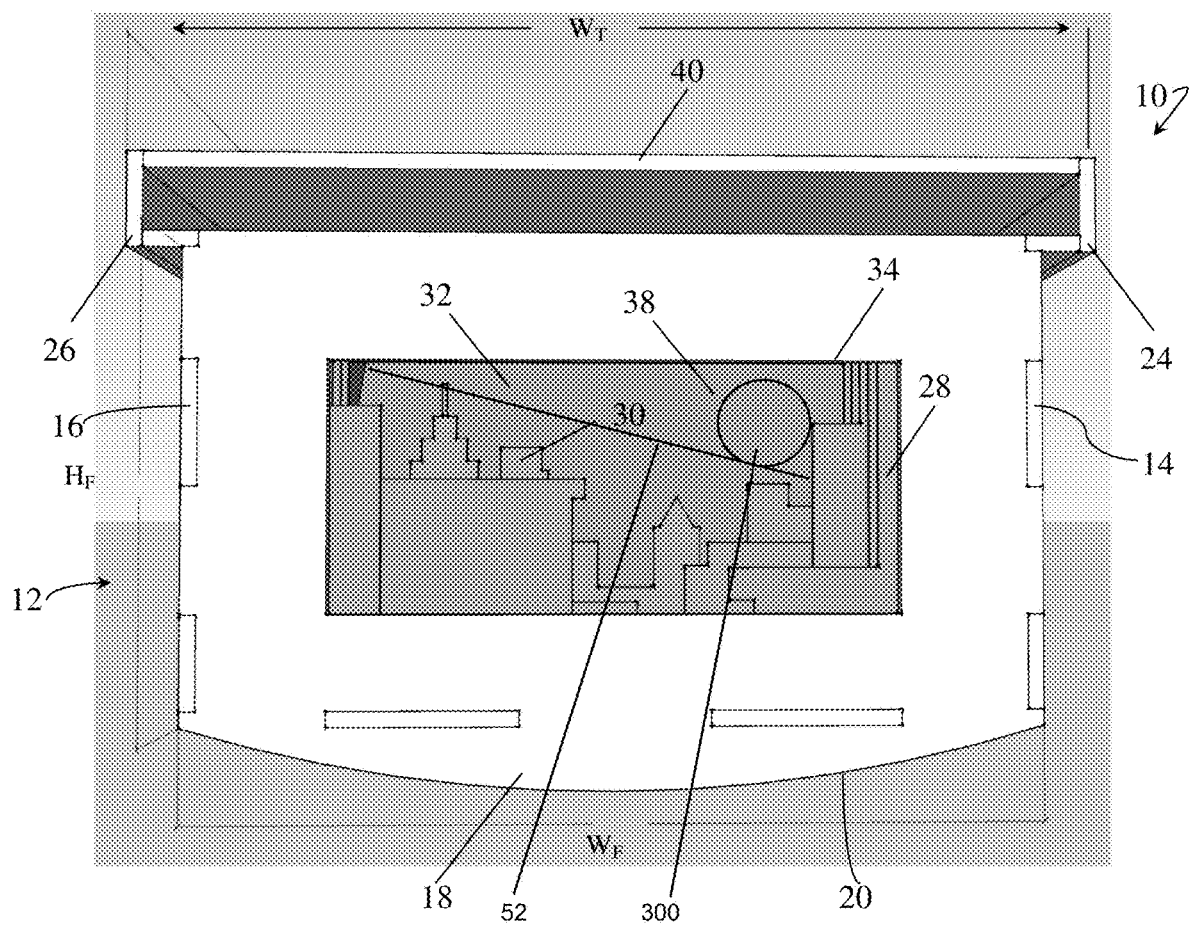
FIG. 10 is a view in front elevation of a further embodiment of the viewing device.

It is further within the scope of the invention for mobile objects to be introduced into the inner volume of the display housing 12, and visual display data emitted from the electronic display device 100 can interact with the mobile object to highlight, accentuate, or otherwise to interact with the mobile object and the movement thereof. Such an embodiment is illustrated in FIG. 10 where a mobile object 300, such as a coin, a disc, a ball, or some other mobile object 300, has been deposited, such as through a slot in the left or right sidewalls 14 or 16, into the display housing 12 to roll across the composite display environment 32 along a dedicated track or ramp 52. By operation of dedicated software retained in electronic memory and processed by the computer processor of the electronic display device 100 and by use of the camera of the electronic display device 100, the mobile object 300 could be tracked and visually acted upon by imaging projected from the electronic display device 100. For instance, in the scenario where the composite display environment 32 comprises a city skyline, a rolling coin mobile object 300 could be highlighted or animated by use of the reflections provided by the two-way anterior mirror 38 and, additionally or alternatively, the rear mirror 36 to simulate the Sun traversing the skyline.

While the electronic display device 100 has been shown and described herein largely as being selectively received by the display housing 12, it is also within the scope of the invention for the electronic display device 100 to be integrated within the viewing device 10. The display housing 12 and the electronic display device 100 could be relatively sized and configured such that the electronic display device 100 is enclosed by the display housing 12 and generally hidden from view. A dedicated electronic display device 100 can be integrated as an internal component of the animation device 10, such as but not limited to by being disposed under the top cover 40 whereby visual data provided by the electronic display device 100 would be integral to the display device 10. Whether the electronic display device 100 is integrated into the display housing 12 or selectively engaged therewith, the display device 10 and the electronic display device 100 cooperate to form a display system according to the invention.

Where selectively received by the viewing device 10, the electronic display device 100 is equipped with electronic memory and one or more computer processors operative to computer software written to operate according to the present invention. If configured as display hardware that is part of the viewing device 10, the electronic display device 100 would again incorporate electronic memory, one or more computer processors, and dedicated computer software. The computer software, electronic memory, and computer processor or processors can cooperate to can provide the visual content to be displayed within the display housing 12. It is also according to practices of the invention for the display system to include customization options and electronic and electromechanical components within the viewing device 10 that can be operative, for example, to adjust various mirrors, light sources, or other components of the display system. The computer software can also comprise electronic instructions to move or replace one or more environment display slides 28 or other components of the composite display environment 32, and retained components can be coupled to other electronic components to permit the reception and execution of software instructions. The computer software can also induce the play of music, and speakers or other like components can be incorporated within or coupled to the viewing device 10 to provide or amplify any aural or audio-based content, either from the electronic display device 10, another external device or a device internal to the viewing device 10. Other variables, such as the illuminated color and, additionally or alternatively, the temperature of the viewing device 10 can be adjustable with software and connected electrical, electro-mechanical, and other components.

In one implementation, if one moves the electronic display device 100, whether it be a computer tablet, a smart phone, or some other electronic display device 100, closer to or further away from the two-way anterior mirror 38, the resulting animation may appear to be move closer to, or further away, respectively, from the viewer, or according to the viewer's point of view. In such an implementation, a feature, such as an electronic motor, or a hand-powered manual crank or lever, can be integrated into the viewing device 10 to change the apparent and perceived depth of the superimposed animation that results in the viewing device 10.

Computer processors have been described in connection with various apparatuses and methods disclosed herein. These processors may be implemented using electronic hardware, computer software, or any combination thereof. Whether such processors are implemented as hardware or software may depend on the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

As the phrase is used herein, computer software shall be construed broadly to include but not necessarily be limited to instructions, instruction sets, code, code segments, program code, programs, subprograms, software modules, applications, software applications, software packages, routines, subroutines, objects, executables, threads of execution, procedures, functions, etcetera, whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory may be referenced separately from the processor or processors in this disclosure, it will be appreciated that the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall display system.

It is to be understood that any perceived or expressed order or hierarchy of steps in the methods disclosed herein are merely illustrations of exemplary processes. Based upon design preferences, it is understood that the specific order or hierarchy of steps in the methods may be rearranged. Any related claims herein may present elements of the various steps in a sample order, but they are not meant to be limited to the specific order or hierarchy presented unless specifically recited therein.

For a firmware and/or software implementation of aspects of the invention, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable media, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 11:
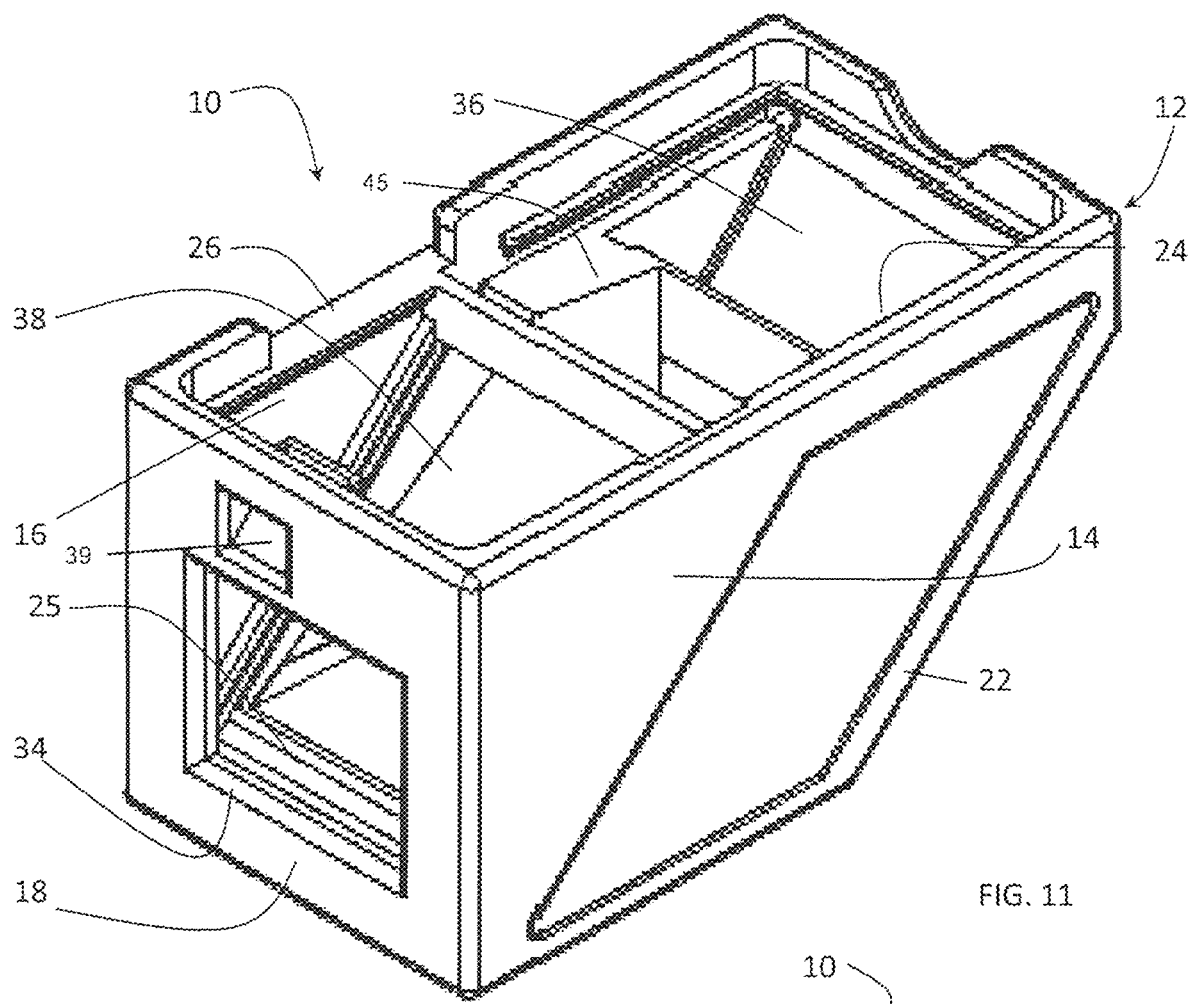
FIG. 11 is a perspective view of an alternative embodiment of a viewing device pursuant to the present invention.
Figure 12:
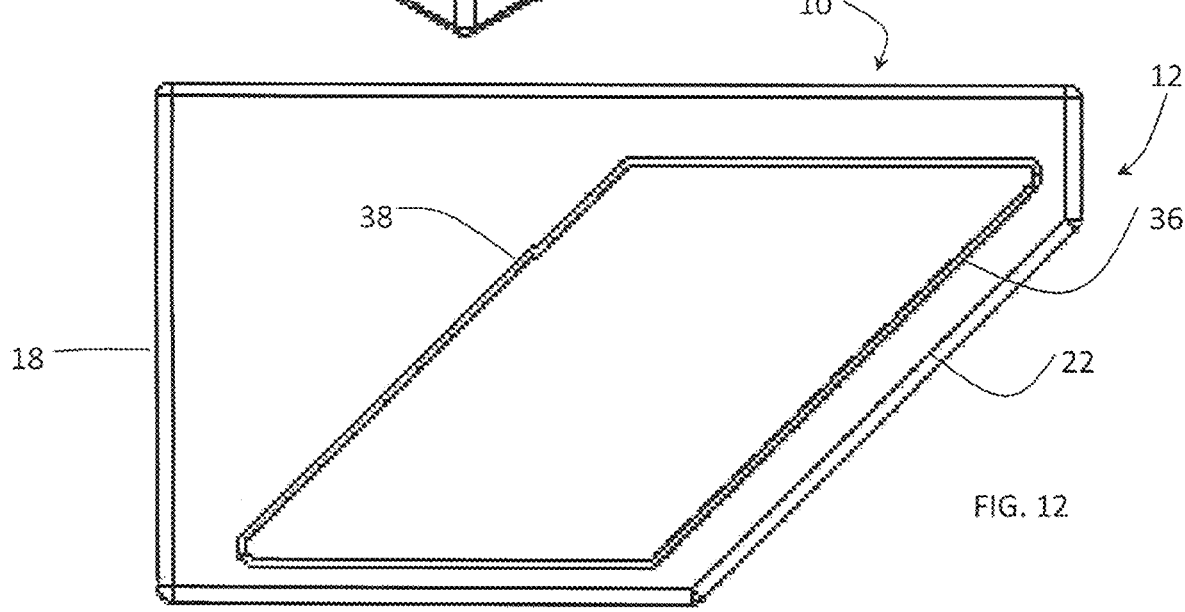
FIG. 12 is a view in side elevation of the viewing device of FIG. 11.

An alternative embodiment of the viewing device 10 is depicted in FIGS. 11 and 12. There, the viewing device is again founded on a display housing 12 with left and right sidewalls 14 and 16, a front wall 18, a rear wall 22, and a bottom 25 that together define an inner volume. A left support rail 24 is disposed at the top of the left wall 14, a right support rail 26 is disposed at the top of the right wall 16, and support rails may be disposed atop the front and rear walls 18 and 22 for supporting an electronic display device 10 as previously shown and described. An electronic display device 100 can thus be disposed atop the display housing 12 with the display surface thereof facing into the inner volume of the display housing 12.

The front wall 18 again has a viewing aperture 34 disposed therein for permitting a viewing into the inner volume of the display housing 12. Rather than receiving slots for receiving environment display slides as previously shown and described to form a composite display environment 32, the present embodiment employs three-dimensional inserts 45 that are removable and replaceable. The inserts 45 can be side loading and can be held in place in any effective manner, such as by magnets, a friction fit, or any other effective method. Each three-dimensional insert incorporates a plurality of layers of display members, each with one or more decorative design features that cooperate to establish the three-dimensional display environment.

A two-way anterior mirror 38 is fixed in place within the display housing 12 anterior to the receiving slots 42 for the display slides 28 such that the two-way anterior mirror 38 is interposed between the viewing window 34 and the composite display environment 32 formed by the plural display slides 28. Thus, the composite display environment 32 formed by the plural display slides 28 is viewed along a line of sight LS through the two-way anterior mirror 38. The two-way anterior mirror 38 is retained tilted rearwardly within the display housing at a 45-degree angle with respect to the parallel planes in which the plural environment display slides 28 are disposed when received within the receiving slot or slots 42. The two-way anterior mirror 38 thus has an upturned face angled at 45 degrees relative to a longitudinal of the housing 12 and at a 45-degree angle relative to the top of the display housing 12.

A rear mirror 36 is fixed in place posterior to the slots or slots 42 provided for receiving the display slides 28 such that the rear mirror 36 is interposed between the rear wall 22 and the composite display environment 32 formed by the plural display slides 28. The rear mirror 36 is again retained tilted rearwardly within the display housing at a 45-degree angle with respect to the planes of the plural environment display slides 28 and with respect to the line of sight that communicates longitudinally within the display housing 12. As such, the rear mirror 36 has an upturned face angled at 45 degrees relative to the longitudinal line of sight and at a 45-degree angle relative to the top of the display housing 12.

Reflections of images projected by an electronic display device 100 disposed atop the display housing 12 from the two-way anterior mirror 38 are thus viewable through the viewing window 34. The rear mirror 36 provides a secondary layer of reflections of images projected by the electronic display device 100. Those dual reflections from the two-way anterior mirror 38 and the rear mirror 36 can be perceived along the line of sight through the viewing window 34. The dual reflections can be viewed through the viewing window 34 in tandem and in cooperation with the composite display environment 32 formed by the display features 30 of the plural display slides 28 to create the illusion of a three-dimensional optical image when a user is looking into the inner volume of the display housing 12 of the viewing device 10 through the viewing window 34.

The viewing device 10 of FIG. 11 further incorporates a third, camera mirror 39 that is disposed to align with the camera of an electronic display device 100, such as the camera of a smart phone 100. The camera mirror 39 is again disposed at a 45-degree angle relative to the longitudinal of the viewing device 10 and, consequently, relative to the face of an electronic display device 100 disposed atop the housing 12. The camera mirror 39 can be operative to reflect the camera of the electronic display device 100 toward a viewer observing the inner volume of the housing 12 through the window 34. This reflection can be used for plural purposes, including to track the viewer's face and eyes to simulate a parallax effect and, potentially, to incorporate some or all of the viewer's face into the animation displaced inside the viewing device 10.

Figure 8:
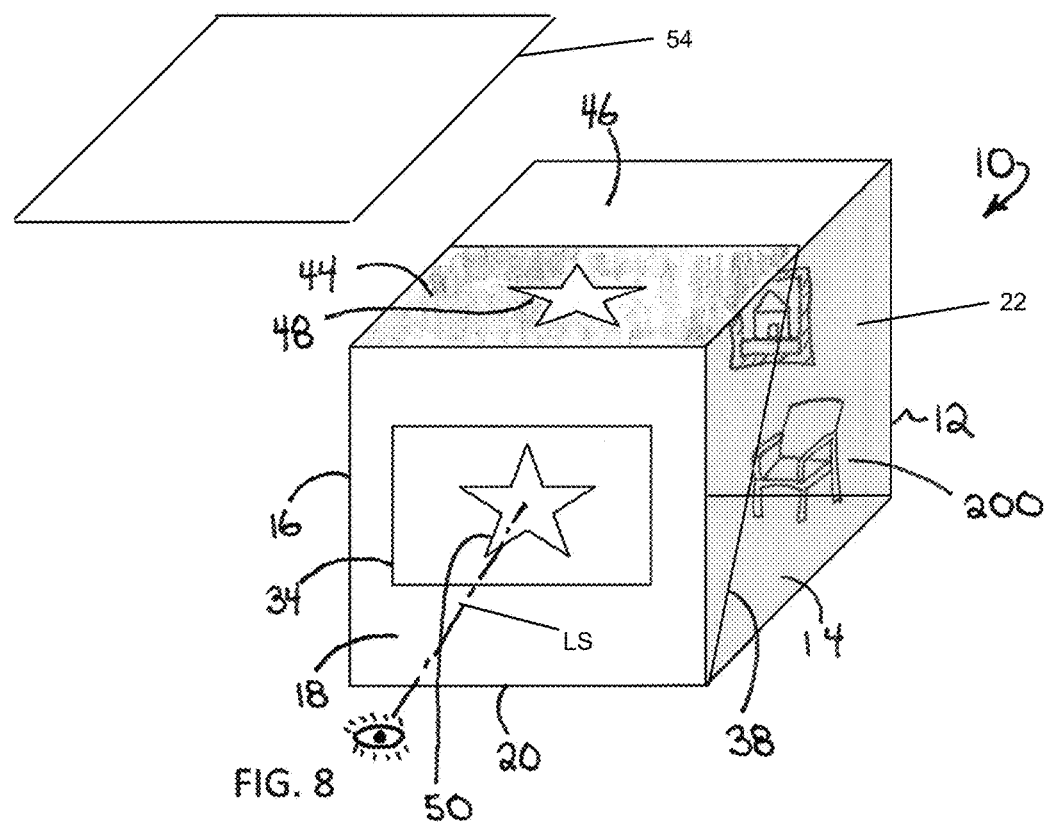
FIG. 8 is a schematic view of a further embodiment of a viewing device according to the invention incorporating sheets of transparency and diffusion material.
Figure 9:
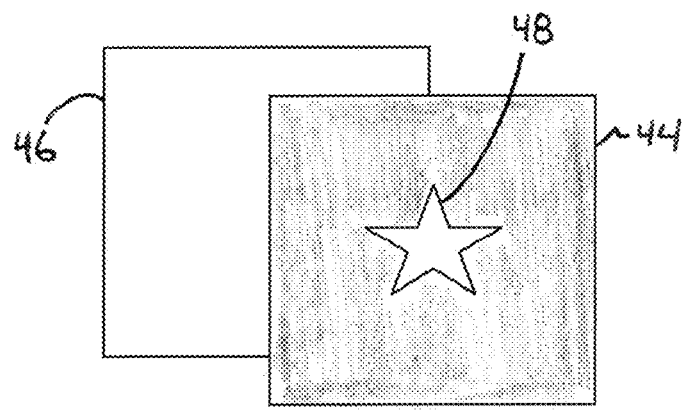
FIG. 9 is a view in front elevation of overlapping sheets of transparency and diffusion material.

Looking to FIGS. 8 and 9, a further embodiment of the display device 10 is illustrated. There, the viewing device 10 is again founded on a box-shaped display housing 12 with a left wall 14, a right wall 16, a front wall 18, and a rear wall 22. A viewing window 34 is disposed in the front wall 18 to enable a line of sight LS into the inner volume of the display device 10, and a two-way anterior mirror 38 is disposed anterior to a three-dimensional environment 200 retained within the display housing 12 posterior to the two-way anterior mirror 38. A transparency 44 with a static image 48 retained thereon is disposed atop the housing 12 of the display device 10. So configured, the viewing device 10 is operative to overlay a projected static image 50 received into the inner volume from the static image 48 on the transparency 44 and reflected by the two-way anterior mirror 38 onto a three-dimensional environment 200 disposed within the display housing 12 posterior to the two-way anterior mirror 38. The display device 10 is operative without the use of a display screen from an electronic display device (not shown in FIGS. 8 and 9) or otherwise.

Rather than requiring an electronic display device, the viewing device 10 is operative through the placement of the transparency 44 within or atop the display housing 12 of the viewing device 10 as shown in FIG. 8. The static image 48 disposed on the transparency 44 thus eventually results in the projected static image 50. When a viewer looks into the viewing device 10 through the window 34 along the line of sight LS, light traveling from a light source, such as the Sun or another illumination source through the diffusion material 46 and through the transparency 44 causes the static image 50 disposed, such as by printing, on the transparency 44 then reflects against the two-way anterior mirror 38 to become the projected static image 50.

The area around the static image 48 on the transparency 44 can be blacked out as shown, and the physical environment 200 can be lit by ambient light traveling through the diffusion material 46. This interplay could be exploited, for example, to display the projected image 50 of a ghost or a secret message or a star or any other projected image 50 or images 50 onto the physical environment 200 or a portion of the environment 200 within the display housing 12. In this regard, it will be noted, that, if the area above the transparency 44 is covered thereby keeping light from passing therethrough, the projected image 50 will disappear from the line of sight LS. With this, a dedicated opaque cover 54 could be employed to allow the user to control the ambient light received through the transparency 44. Applying the cover 54 causes the projected image 50 to disappear, and removing or opening the cover 54 could reveal the projected image 50 within the physical environment 200.

Figure 13:
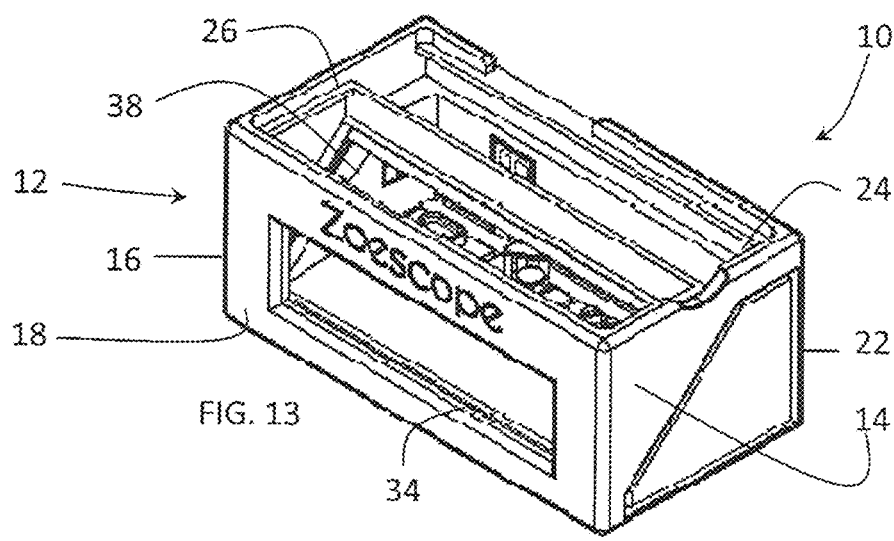
FIG. 13 is a perspective view of another embodiment of the viewing device.
Figure 14:
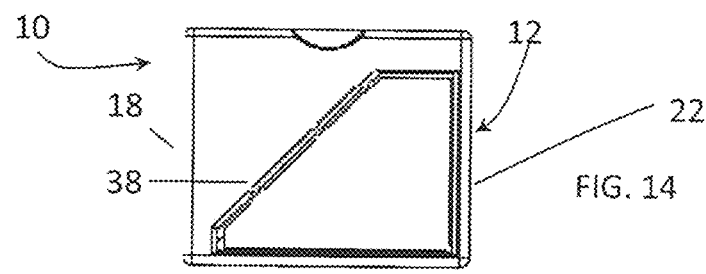
FIG. 14 is a view in side elevation of the viewing device of FIG. 13.
Figure 15:
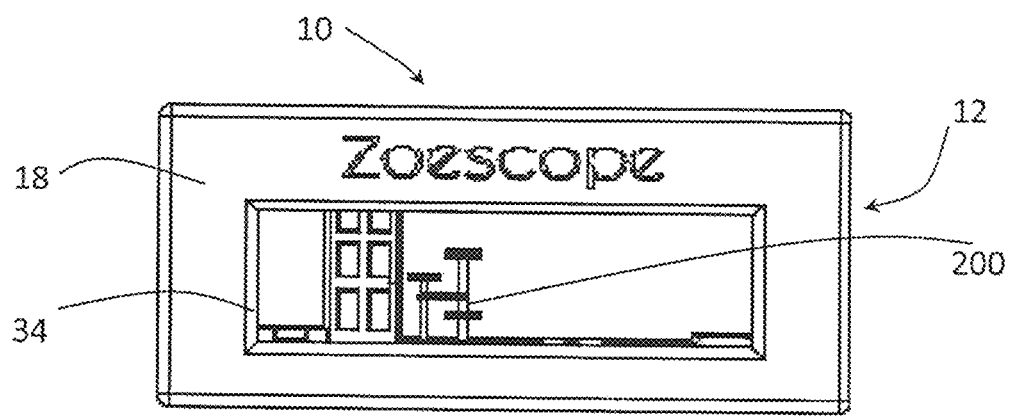
FIG. 15 is a view in front elevation of the viewing device of FIG. 13.

Another embodiment of the display device 10 is illustrated in FIGS. 13 through 15 where viewing device 10 is again founded on a display housing 12 with a left wall 14, a right wall 16, a front wall 18, and a rear wall 22. The front wall 18 has a viewing window 34 therethrough to enable a line of sight into the inner volume of the display device 10. A two-way anterior mirror 38 is disposed anterior to a volume within the housing 12 for receiving a three-dimensional environment 200 to be selectively retained within the display housing 12 posterior to the two-way anterior mirror 38. Left, right, anterior, and posterior rails 24 and 26 are provided for supporting an electronic display device 100 as previously shown and described or for supporting a transparency 44 with one or more static image 48 retained thereon again as shown and described previously. The viewing device 10 is thus operative to overlay an image from the electronic display device or from the transparency received into the inner volume and reflected by the two-way anterior mirror 38 onto the three-dimensional environment 200 disposed within the display housing 12 posterior to the two-way anterior mirror 38.

Although the present disclosure and its advantages have been described in detail, it should be understood that various changes, substitutions and alterations can be made herein without departing from the technology of the disclosure as defined by the appended claims. For example, relational terms, such as "upper", "top", "bottom", "above", and "below", may be used with respect to one or more components of the display system. If any such component is inverted, the foregoing may be reversed or otherwise altered, and the claims should be interpreted to cover any such repositioning. Moreover, the scope of the present application is not intended to be limited to the particular configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The invention claimed is:

1. A viewing system for integrating images from an electronic display device with a three-dimensional display environment, the viewing system comprising:
   a viewing device comprising:
   a display housing with an inner volume, an anterior end, and a posterior end, wherein the display housing has a viewing aperture in the anterior end thereof for permitting a line of sight into the inner volume of the display housing;
   a reception structure for receiving and supporting the electronic display device with a display surface of the electronic display device facing toward the inner volume of the display housing wherein the display housing is at least partially open proximal to the reception structure whereby images emitted by the display surface of the electronic display device can be received into the inner volume of the display housing;
   at least one display insert for being disposed at a display location within the display housing to be viewed through the viewing aperture wherein the display insert establishes a three-dimensional environment wherein the at least one display insert comprises a display slide with one or more apertures therethrough defining one or more decorative design features;
   a first mirror retained within the housing wherein the first mirror is disposed at an angle operative to reflect images emitted by the display surface of the electronic display device toward and through the viewing aperture to be viewed in integration with the three-dimensional display environment within the display housing established by the display insert;
   wherein the display housing has a lower rocking surface configured to permit a rocking of the display housing.

2. The viewing system of claim 1, further comprising an electronic display device with a display surface and computer software retained in electronic memory wherein the electronic display device is operative to execute the computer software retained in electronic memory to produce display effects based at least in part on the rocking of the display housing permitted by the lower rocking surface.

3. The viewing system of claim 2, wherein the electronic display device comprises a tablet computer or a smart phone.

4. The viewing system of claim 1, wherein the reception structure comprises a reception slot for receiving and supporting the electronic display device.

5. The viewing system of claim 1, wherein there are plural display inserts, each comprising a display slide with one or more apertures therethrough defining one or more decorative design features, and wherein the plural display inserts can be retained within the display housing to cooperate to establish the three-dimensional display environment.

6. The viewing system of claim 5, wherein the display housing has plural receiving formations for individually receiving the plural display inserts to form the three-dimensional display environment.

7. The viewing system of claim 6, wherein the plural receiving formations are operative to retain the plural display inserts in spaced, parallel planes.

8. The viewing system of claim 7, wherein the plural receiving formations are operative to retain the plural display inserts in spaced, parallel planes orthogonal to a longitudinal of the display housing from the anterior to the posterior end thereof.

9. The viewing system of claim 8, wherein the plural receiving formations comprise slots.

10. The viewing system of claim 9, wherein the plural display inserts are removable and replaceable relative to the display housing whereby the three-dimensional display environment can be selectively varied.

11. The viewing system of claim 1, wherein the first mirror comprises a two-way mirror.

12. The viewing system of claim 11, wherein the two-way mirror is disposed anterior to the display location of the at least one display insert whereby the two-way mirror is interposed between the anterior end of the display housing and the display location of the at least one display insert.

13. The viewing system of claim 12, further comprising a second mirror.

14. The viewing system of claim 13, wherein the second mirror is disposed posterior to the display location of the at least one display insert whereby the second mirror is interposed between the posterior end of the display housing and the display location of the at least one display insert wherein the line of sight communicates codirectionally with a longitudinal through the inner volume of the display housing and orthogonal to the display slide, wherein the first and second mirrors are disposed along the line of sight.

15. The viewing system of claim 14, wherein the first and second mirrors are disposed at an approximately 45-degree angle relative to the longitudinal of the display housing.

16. The viewing system of claim 1, wherein the lower rocking surface is operative to permit a lateral rocking of the display housing.

17. The viewing system of claim 16, further comprising a mobile object conveying surface for receiving and guiding mobile objects inserted into the display housing whereby the mobile objects can be interacted with by visual display data emitted by the electronic display device.

18. The viewing system of claim 17, wherein the mobile object conveying surfaced comprises a ramp for permitting a mobile object inserted into the display housing to roll along the ramp.

19. A viewing system for integrating images from an electronic display device with a three-dimensional display environment, the viewing system comprising:
- a viewing device comprising:
  - a display housing with an inner volume, an anterior end, and a posterior end, wherein the display housing has a viewing aperture in the anterior end thereof for permitting a line of sight into the inner volume of the display housing;
  - a reception structure for receiving and supporting the electronic display device with a display surface of the electronic display device facing toward the inner volume of the display housing wherein the display housing is at least partially open proximal to the reception structure whereby images emitted by the display surface of the electronic display device can be received into the inner volume of the display housing;
  - at least one display insert for being disposed at a display location within the display housing to be viewed through the viewing aperture wherein the display insert establishes a three-dimensional environment;
  - a first mirror retained within the housing wherein the first mirror is disposed at an angle operative to reflect images emitted by the display surface of the electronic display device toward and through the viewing aperture to be viewed in integration with the three-dimensional display environment within the display housing established by the display insert;
  - wherein the at least one display insert comprises a three-dimensional insert that is removable and replaceable relative to the display housing whereby the three-dimensional display environment can be selectively varied and wherein the three-dimensional insert comprises at least one display slide with one or more apertures therethrough wherein the one or more apertures defines one or more decorate design features.

20. The viewing system of claim 14, further comprising a third mirror comprising a camera mirror wherein the camera mirror is disposed to align with a camera of the electronic display device and wherein the camera mirror is disposed at an approximately 45-degree angle relative to a longitudinal of the display housing.

21. The viewing system of claim 16, wherein the display housing comprises a box-shaped display housing with a front wall, a rear wall, a left sidewall, a right sidewall, and a bottom, wherein the front wall, the rear wall, the left sidewall, the right sidewall, and the bottom together define an inner volume, and wherein the lower rocking surface comprises arcuate lower edges of the front and rear walls.

22. The viewing system of claim 18, further comprising an electronic display device with a display surface and a camera and computer software retained in electronic memory wherein the electronic display device is operative to execute the computer software retained in electronic memory to cause the mobile object to be tracked and visually acted upon by imaging projected from the electronic display device.

23. The viewing system of claim 19, wherein the three-dimensional insert is removable and replaceable by side loading.

24. The viewing system of claim 19, wherein the three-dimensional insert comprises a plurality of layers of display slides, each display slide with one or more apertures therethrough that defines one or more decorative features.

* * * * *